INVENTOR.
BETTY J. WILLIAMS
BY
ATTORNEYS.

United States Patent Office 3,333,351
Patented Aug. 1, 1967

3,333,351
TEACHING DEVICE
Betty J. Williams, 3538 Tamerisk Court,
Bakersfield, Calif. 93306
Filed Aug. 20, 1965, Ser. No. 481,159
16 Claims. (Cl. 35—35)

This invention relates to means for teaching the English language.

The ability effectively to communicate in the English language requires the ability to prepare at least three principal types of sentences. While a dialogue consisting exclusively of sentences of these three types is certainly less than sparkling, still it can constitute a sufficient base for effective communication between one person and another, and represent a vast improvement in the life of an individual previously unable so to communicate. Furthermore, improved linguistic ability can be based and taught upon these few skills.

Persons who belong to a group denoted the "perceptually deprived" have a serious need for rudimentary language skills such as the above. The group defined as "perceptually deprived" includes the culturally deprived person in whose home communication is largely ungrammatical, profane, or even merely non-existent. It also includes the auditorially and neurologically damaged or deficient person. The language skill acquired by an average or normal person in his normal life is missing as to these people, and ordinary sentences are essentially meaningless to them. For such a group, or for that matter even for persons whose mother tongue is other than English, a structural technique is quite useful in teaching the building of a useful sentence. So far, such a technique has been incompletely supplied, if at all.

For example, the classical division of a sentence into its grammatical parts is difficult enough for a person who already possesses skills in English. To a perceptually deprived person whose skills are nil, it is a meaningless exercise which is well beyond his ability.

It is an object of this invention to provide a mechanical means for constructing English sentences in which the student is made aware by the means itself whether the sentence he essays is in fact a valid English sentence and, if not, what is wrong with it. It is to be noted that this technique presupposes the existence of a vocabulary, because valid sentences can be made which are meaningless. Nevertheless, a person possessing the ability to create a sentence at all rarely has the problem of making it somehow intelligible. The problem faced by the perceptually deprived person is just the reverse. He may know a few or many words, but his ability to communicate is lacking because of his inability to assemble the words meaningfully. This invention provides means to overcome this deficiency by providing a structural model which compels the user to assemble words in the form of valid English sentences.

A sufficient grounding in English can be had upon the mastery of three classes of sentences. These classes are:

(a) NP+Be+Completer (Be sentence);
(b) NP+VT+Object (transitive verb sentences); and
(c) NP+ITV (intransitive verb sentences).

The abbreviations used for defining these sentences are as follows:

NP—a noun phrase, either singular or plural, such as: the boy, the boys, the tree, or the trees Be—a singular or plural, past or present form of the verb "to be" such as: is, are, was or were Completer—a word such as an adjective which will complete a "Be" type sentence VT—a transitive verb, singular or plural, past or present, which takes an object such as: threw, throws, passed, passes ITV—an intransitive verb, singular or plural, past or present, which does not take an object, such as: laughs, laugh, coughs, coughed An example of a Class (a) sentence is: "The boy is happy." An example of a Class (b) sentence is: "The boy threw the ball." An example of a Class (c) sentence is: "The boy laughs."

Structurally, the problem is to assure the presence of an NP in every sentence, together with either a Be, a VT or an ITV of the correct number, that is whether singular or plural, to agree with the number of the NP, and then, depending upon whether a Be, VT or ITV is used, to assure the presence of a Completer or an Object or, in the case of an ITV, of nothing at all.

This invention is carried out with the following means when all of the classes of sentences are being taught at the same time. Of course it is possible to subdivide the following groups so as to teach fewer than all classes of sentences at once. The said means comprises a body bearing indicia of an NP having a first face, a body bearing indicia of a Be and having a second and third face, a body bearing indicia of a VT and having a second and third face, a body bearing indicia of an ITV and having a second and third face, a body bearing indicia of a Completer having a fourth face, and a body bearing indicia of an Object having a fourth face. The first and second faces in all classes of sentences and the third and fourth faces in Class (a) and Class (b) sentences are adapted to be placed in contiguity with each other in pairs and justification means adjacent to each of said faces are borne by the bodies as follows: adjacent to the first face, justification means indicative of the plural or singular number of the NP borne by the body; adjacent to the second face justification means indicative of the plural or singular number of the respective Be, VT or ITV borne by the body; adjacent to the third face, justification means on bodies bearing Be or VT indicative of the need for a Completer or any Object, respectively; and adjacent to the fourth face, justification means on bodies bearing a Completer or an Object, the justification means adjacent to the first and second faces being complementary and exclusive for number, whereby to indicate correct and incorrect association, and the justification means adjacent to the third and fourth faces being complementary to indicate a requirement for presence of a Completer or Object, and to indicate correct or incorrect association.

According to a preferred but optional feature of the invention, the justification means comprises a recess in one of the first and second faces and a projection from the other, the size of the recess and projection for singular and plural being different and, as to number, complementary.

According to still another preferred but optional feature of the invention, the justification means comprises a recess in one of the third and fourth faces and a projection from the other, the size of the recess and projection for singular and plural being different and, as to number, complementary.

According to still another preferred but optional feature of the invention, the aforesaid projections and recesses are mutually reentrant and entrant to form locking shapes, whereby respective singular and plural justification means will lock the bodies together, the dimensions of the projection being such that mismatched singular and plural justification means are slidably separable.

The above and other features of this invention will be fully understood from the following detailed description and the accompanying drawings in which.

Figure 1:
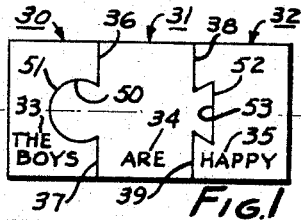
FIGS. 1 and 2 are plan views of bodies forming B*e* type sentences, plural and singular, respectively.

The presently preferred embodiment of the invention is shown in FIGS. 1–9. In FIG. 1, bodies 30, 31, 32 are shown assembled so as to form a complete B*e* type Class (*a*) sentence. Body 30 bears indicia 33 of an NP, in this case a plural noun with its article. Body 31 bears indicia 34 representative of a plural form of the verb "to be." Body 32 bears indicia 35 of a Completer.

The sentence formed is: "The boys are happy." Body 30 has a first face 36, body 31 has a second and third face 37 and 38, respectively, and body 32 has a fourth face 39. The first and second faces are intended to be contiguous to each other, and the third and fourth faces are intended to be contiguous to each other. The bodies in these and all other figures are flat plates, such as cardboard, plastic, or the like, which will lay flat on a surface. Of course, other shapes of bodies may be provided, but the flat plate is the most convenient.

Figure 2:
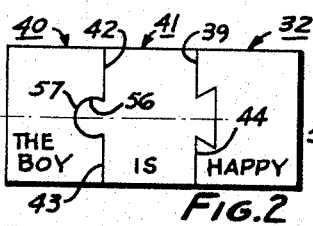
Figure 3:
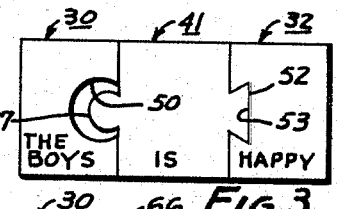
FIGS. 3 and 4 are plan views of bodies forming incorrect and incomplete Be type sentences, respectively.

FIG. 2 shows the singular of the same sentence as in FIG. 1, there being a body 40 and body 41, which are combined with body 32. Body 40 has a first face 42; body 41 has a second and third face 43, 44; and body 32 has the fourth face 39 previously referred to.

The bodies carry various justification means. For example, body 30 carries a justification means in the form of a reentrant recess 50 at its first face. An entrant projection 51 is provided as a justification means at the second face on body 31, and an entrant projection 52 is provided at the third face thereof. At the fourth face, a reentrant recess 53 is formed. An axis 55 is shown extending axially along the alignment of the device, and it will be seen that these justification means are symmetrical around this axis so that either side of the bodies could be used. The advantage of this is that immediate constituents of words, such as "trees" on one side and "birds" on the other, or "boys" on one side and "girls" on the other, could be provided. In the example shown, the words might be "happy" and "sad" or on body 31, the past tense of the verbs. In brief, this at least doubles the utility of the set, because both sides can be used. This is also true of all of the other symmetrical forms of justification means used herein.

The justification means also provide indications and association of additional features such as the singular or plural. Note the difference in size of justification means on the first face of bodies 30 and 40. Justification means 56 on body 40 is smaller than that on body 30, as is justification means 57 on body 41 as compared to justification means 51 on body 31. The reason for selection of the relationship is so that the smaller may be associated with the singular, and the larger with the plural. As can best be seen in FIG. 3, the greatest lateral dimension of justification means 57 is smaller than the lesser dimension of recess 50 so that the bodies can be slid apart by relative axial movement. This means that the sentence will not "hold together" and there is an immediate indication of error, because they will not hold or lock together, and also because there is a void in what is otherwise a complete and continuous rectangular surface. These justification means are therefore complementary and exclusive as to number.

The Completer respective to body 32 is, of course, suitable for use with either the singular or the plural form of the "Be" word.

Figure 4:
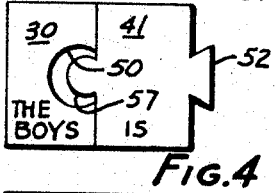

FIG. 4 illustrates an incomplete Be sentence in that justification means 52 projects beyond the third face so as to show the need for an additional means such as the Completer. The same disparity between number is illustrated in FIG. 4 as in FIG. 3.

Figure 5:
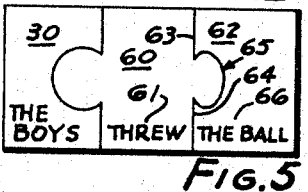
FIG. 5 is a plan view of bodies forming a correct VT sentence.
Figure 6:
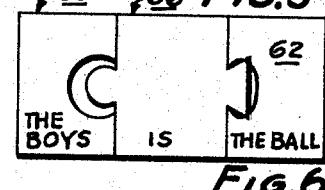
FIGS. 6 and 7 are plan views of bodies forming incorrect and incomplete VT sentences, respectively.
Figure 7:
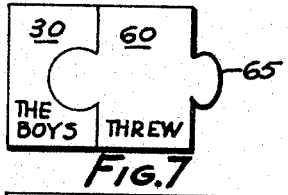

FIGS. 5–7 illustrate a Class (*b*) sentence (transitive verb sentence) utilizing a VT. In FIGS. 5–7, body 30 is the same as in the other figures, while another body 60 with second and third faces is provided which bears an indicia 61 of a VT or transitive verb. There is also a body 62 which has a fourth face 63 adapted to stand adjacent to third face 64 of body 60. The second face of body 60 bears justification means the same as those of the second face in the examples of FIGS. 1–4. However, the third face of body 60 and the fourth face of body 62 bear justification means 65 of a different shape than those on a body bearing a "Be" word. Preferably, the justification means comprises a projection on the third face and a recess in the fourth face, these being reentrant and locking, but of different shape than those which correspond to a Completer in order that an Object may not be confused with a Completer. There is an Object indicia 66 on body 62.

FIG. 6 shows a completely improper sentence made up of body 30 with a plural NP, a body 66 bearing a singular "Be" word, and an attempt to apply body 62 with an Object body bearing a Be. In this case, the same mistake of number is shown as in FIG. 4, and at the right, it will be seen that the form of justification means 52 of FIG. 1 will not jibe with the form of the justification means of body 62. They therefore overlap and cannot form a complete sentence. The bodies will slide apart, and also they will leave voids in the surface when the faces are contiguous so that the incomplete notation is evident.

FIG. 7 utilizes bodies 30 and 60, justification means 65 projecting beyond body 60 so as to form an irregular surface, thereby showing the need for an Object.

Figure 9:
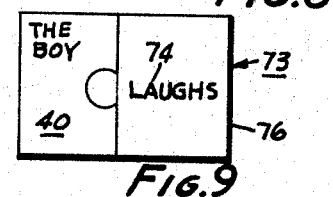
Figure 10:
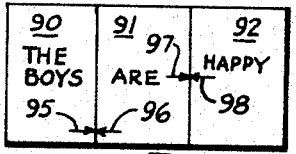
FIGS. 10–18 are plan views corresponding respectively to FIGS. 1–9, showing the same sentence structures formed by bodies that incorporate a different embodiment of the invention.

The third class, Class (*c*) of sentence (intransitive verb sentence) is shown which utilizes an ITV. In this case, body 30 is shown with its same justification means, and a body 70 bearing the indicia 71 of an ITV, in this case, the verb "to laugh" which does not take an Object. Body 70 bears justification means 72 identical to justification means 51 in FIG. 1. The singular form is shown in FIG. 9, where body 40 is combined with a body 73 which bears a plural indicia 74 of an ITV. Its justification means at its second face are the same as justification means 57 in FIG. 2.

Figure 8:
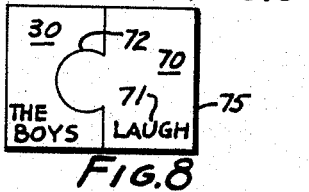
FIGS. 8 and 9 are plan views of bodies forming correct ITV sentences, plural and singular, respectively.

Of importance in this class of sentence is the right-hand or third face 75 in FIG. 8, and third face 76 in FIG. 9, which are square and indicate the lack of any need for additional words. Therefore the third face justification carried by the ITV body is a lack of projection or marking, and no fourth face abuts it in a proper sentence. Preferably, this third face will be straight, or of such other shape as will form a continuous peripheral boundary of the assembled structure which is symmetrical or otherwise accepted as indicative of a complete and correct ITV sentence. The sentence is complete as it is.

Figure 22:
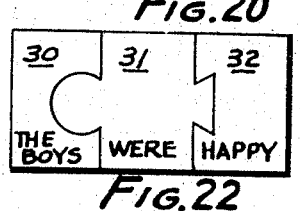
FIGS. 22 and 23 are plan views corresponding to FIGS. 1 and 8, respectively, showing bodies forming the past tense instead of the present tense.
Figure 23:
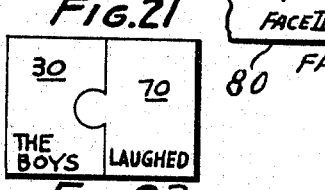

It will thereby be seen from the foregoing that the complete and accurate sentences provide an imperforate and continuous surface, and preferably a rectangular, complete structure which will structurally hold together. FIGS. 22 and 23 show the use of bodies 30, 31 and 32 and of 30 and 70, respectively, as in FIGS. 1 and 8, but with bodies 31 and 70 turned over to provide the past tense rather than the present. The symmetry of the justification means permits this inversion.

FIGS. 10–18 illustrate that the justification means need not be structural, but may be visual only, and that many of the objectives can be accomplished by these other more limited means. Of course, there is the sacrifice of the structural technique of the complete sentence holding together, and of forming a closed and complete surface, but there still remains the utility of indication of the propriety of association of the bodies.

Figure 19:
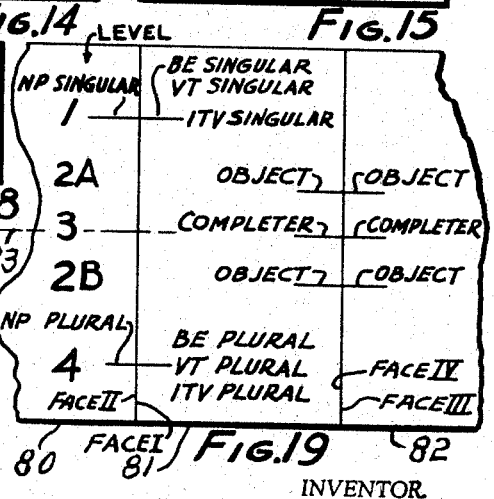
FIG. 19 is a schematic illustration of the theory of the embodiments of FIGS. 10–18.

This embodiment is based upon the illustration in FIG. 19, wherein generalized bodies 80, 81 and 82 are shown. Levels indicated as 1, 2a, 3, 2b and 4 are provided which are symmetrical around axis 83 at level 3. Body 80 carries the NP notation as heretofore discussed at levels 1 and 4 which are respectively those of NP singular and plural, and these are adjacent to face I of body 80. Adjacent to face II of body 81 and at level 1, there is the indication of Be singular, VT singular, and ITV singular, and at level 4 of Be plural, VT plural, and ITV plural. At face III of body 81, at levels 2a and 2b, there is an Object notation, and at level 3, there is a Completer notation. Because the Completer and Object do not have any requirement to conform as to number, these notations are symmetrical around axis 83 so as to be useful with singular and plural forms of the verbs. At face IV, there is at levels 2a and 2b, an Object notation, and at level 3, Completer notation. The presence of Object or Completer notation at the third face indicates the requirement for a similar element at the fourth face, and the absence of any from the third face indicates that no third body such as 82 is required. Of course, any one body will have only Completer or Object notation, and as to objects, the notation will be supplied at levels 2a and 2b if symmetry is desired.

Figure 11:
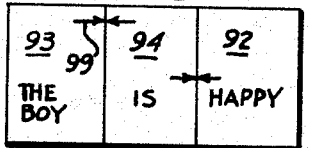
Figure 12:
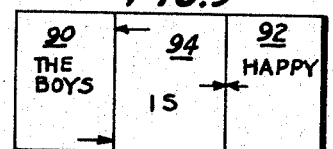
Figure 13:
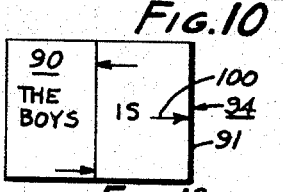

FIGS. 10–18 repeat the grammar of FIGS. 1–9, respectively. For exemple, bodies 90, 91, 92 correspond to bodies 30, 31 and 32 of FIG. 1. In FIG. 11, bodies 93 and 94 correspond to bodies 40 and 41 of FIG. 2. Justification means comprising arrows 95, 96 are provided at the first and second faces of bodies 90 and 91. Justification means 97, 98 are provided at the third and fourth faces of bodies 91 and 92. These arrows match, and the sentence is correct. Similarly, the singular is shown with justification means 99 at level 1 instead of at level 4 as in FIG. 10. FIG. 12 shows the justification means at the first and second faces do not match and that the sentence is shown to be incorrect. In FIG. 13, justification means 100 at the third edge of body 91 indicates that a respective justification means is required and that the sentence is incomplete.

Figure 14:
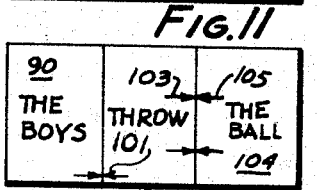

FIG. 14 shows a VT sentence with justification means 101 at the second face of body 102 that matches with the justification means on body 90. Body 102 also carries at its third face justification means 103 indicating the requirement of an Object. Body 104 carries an Object, to wit, "the ball" and with it, justification means 105 showing its presence.

Figure 15:
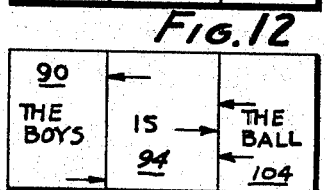

FIG. 15 shows a mismatch in number between body 90 and body 91 and also a mismatch between a Be form carried on body 91 and an Object carried on body 104, showing that the sentence is incorrect.

Figure 16:
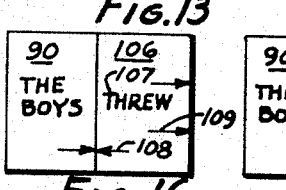

FIG. 16 shows a body 106 carrying a VT indicia 107 which includes justification means 108 that match that on body 90. However, it also shows the requirement for an Object by justification means 109, the absence of matching justification means indicating the incompleteness of the sentence.

Figure 17:
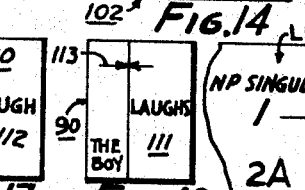
Figure 18:
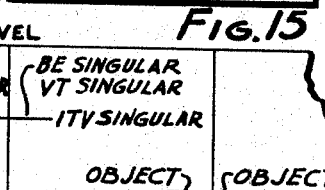

FIGS. 17 and 18 show the singular and plural of an ITV sentence utilizing bodies 90, 110 and 111. Justification means 112 at level 4 indicate correctness in FIG. 17, and justification means 113 at level 1 indicate correctness in FIG. 18.

Figure 20:
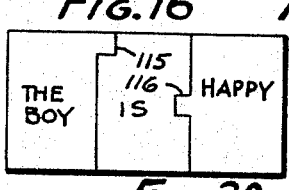
FIG. 20 shows bodies forming a singular Be sentence with another embodiment of the invention.
Figure 21:
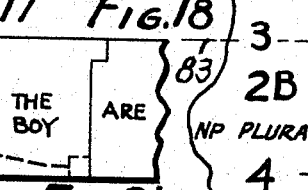
FIG. 21 is a fragmentary plan view of bodies forming part of an incorrect Be sentence utilizing the means of FIG. 20.

FIGS. 20 and 21 show justification means 115 and 116 which are recesses and projections, but which do not lock. As can be seen in FIG. 21, mismatching justification means of this type can overlap as at 118 to indicate incorrectness.

It will be understood that whenever projections and recesses are provided for in one or the other faces, the arrangement may be reversed without impairment of function.

This invention thereby provides a means for teaching the English language indicating the completeness or incompleteness of the sentence and the suitability of the words used therein, so that a person with little conception of the English language may still learn correct sentence structure, and the sound and appearance of a correct sentence by mechanical means. This provides for the person an approach known as TVAK, that is, tactile, visual, auditory and kinesthetic. The impairment of one of these abilities in a perceptually deprived person may be compensated by one or the other. In addition, the letters may be raised for "are" or "is" as to size or number, thereby to provide for tactile and kinesthetic experience as well as visual which is useful for language-deprived children. Also, the blocks may be colored or textured appropriately so as to provide still further indications of the meanings of the language indicia which the bodies bear. The vocabulary can be expanded as the person learns more of the English language, and the bodies can be provided blank so the instructor may himself apply to the bodies words respective to the person's needs.

This invention is not to be limited by the embodiments shown in the drawings and described in the description which are given by way of example and not of limitation, but only in accordance with the scope of the appended claims.

I claim:

1. Means for teaching English sentence structure of the classes comprising the following forms: NP+Be+Completer; NP+VT+Object; and NP+ITV, said means comprising:
   (a) a body bearing indicia of an NP and having a first face;
   (b) a body bearing indicia of a Be and having a second and third face;
   (c) a body bearing indicia of a VT and having a second and third face;
   (d) a body bearing indicia of an ITV and having a second and third face;
   (e) a body bearing indicia of a Completer and having a fourth face; and
   (f) a body bearing indicia of an Object and having a fourth face;

said first and second faces, and said third and fourth faces being adapted to be placed in contiguity with each other in pairs, and justification means carried by the respective bodies adjacent to said faces as follows:
   (a) adjacent to the first face, justification means indicative of the plural or singular number of the NP borne by the body;
   (b) adjacent to the second face, justification means indicative of the plural or singular number of the respective Be, VT or ITV borne by the body;
   (c) adjacent to the third face, justification means on bodies bearing Be or VT indicative of the need for a Completer or an Object respectively; and
   (d) adjacent to the fourth face, justification means on bodies bearing a completer or an Object, the justification means adjacent to the first and second faces being complementary and exclusive for number whereby to indicate correct and incorrect association, and the justification means adjacent to the third and fourth faces being complementary to indicate a requirement for presence of a Completer or Object, and to indicate correct or incorrect association.

2. Means according to claim 1 in which the justification means comprises a recess in one of the first and second faces, and a projection from the other, the size of the recess and projection for singular and plural being different and, as to number, complementary.

3. Means according to claim 2 in which the justification means on the first and second faces are symmetrical about a coincident axis when said faces are in contiguity, whereby either of the bodies bearing the first and second faces can be turned over, still maintaining the same relative relationship of justification means, in order to provide for tense variation.

4. Means according to claim 2 in which the said recess is reentrant in shape and the projection is an entrant, locking shape, whereby respective singular and plural justification means lock the bodies together, the dimensions of the projection being such that mismatched singular and plural justification means are axially separable.

5. Means according to claim 4 in which the recess and projection are symmetrical about a coincident axis when the first and second faces are in adjacency, whereby either of the bodies bearing the first and second faces can be turned over still maintaining the same relative relationship of justification means, in order to provide for tense variation.

6. Means according to claim 1 in which the justification means comprises a recess in one of the third and fourth faces, and a projection from the other, the size of the recess and projection for singular and plural being different, and, as to number, complementary.

7. Means according to claim 6 in which the said recess is reentrant in shape and the projection is an entrant, locking shape, whereby respective singular and plural justification means lock the bodies together, the dimensions of the projection being such that mismatched singular and plural justification means are axially separable.

8. Means according to claim 1 in which the justification means at the first and second faces comprises marks at levels respective to the nature and number of the indicia borne by the respective body, and in which the justification means at the third and fourth faces comprise marks at levels respective to the requirement for and the presence of a member of the group consisting of Completer and Objects.

9. Means for teaching English sentence structure of the classes comprising the following forms:

$$NP > \begin{array}{l} Be\text{—Completer} \\ VT\text{—Object} \end{array}$$

comprising:
(a) a body bearing indicia of an NP and having a first first face;
(b) a body bearing an indicia of a member selected from the group consisting of Be and VT, and having a second and a third face; and
(c) a body bearing an indicia of a member selected from the group consisting of Completer and Object, and having a fourth face;

said first and second faces, and said third and fourth faces being adapted to be placed in contiguity with each other, and justification means carried by the respective body adjacent to each of said faces as follows:
(a) adjacent to the first face, justification means indicative of the plural or singular number of the NP borne by the body;
(b) adjacent to the second face, justification means indicative of the plural or singular number of the selected member borne by the body;
(c) adjacent to the third face, justification means indicative of the need for a Completer or an Object respective to the selected member borne by the body; and
(d) adjacent to the fourth face, justification means respective to the member selected, the justification means adjacent to the first and second faces being complementary and exclusive for number whereby to indicate correct and incorrect association, and the justification means adjacent to the third and fourth faces being complementary to indicate a requirement for presence of a Completer or Object, and to indicate correct or incorrect association.

10. Means according to claim 9 in which the justification means comprises a recess in one of the first and second faces, and a projection from the other, the size, of the recess and projection for singular and plural being different and, as to number, complementary.

11. Means according to claim 10 in which the justification means on the first and second faces are symmetrical about a coincident axis when said faces are in contiguity, whereby either of the bodies bearing the first and second faces can be turned over, still maintaining the same relative relationship of justification means, in order to provide for tense variation.

12. Means according to claim 10 in which the said recess is reentrant in shape and the projection is an entrant, locking shape, whereby respective singular and plural justification means lock the bodies together, the dimensions of the projection being such that mismatched singular and plural justification means are axially separable.

13. Means according to claim 12 in which the recess and projection are symmetrical about a coincident axis when the first and second faces are in adjacency, whereby either of the bodies bearing the first and second faces can be turned over, still maintaining the same relative relationship of justification means, in order to provide for tense variation.

14. Means according to claim 9 in which the justification means comprises a recess in one of the third and fourth faces, and a projection from the other, the size of the recess and projection for singular and plural being different, and, as to number, complementary.

15. Means according to claim 14 in which the said recess is reentrant in shape and the projection is an entrant, locking shape, whereby respective singular and plural justification means lock the bodies together, the dimensions of the projection being such that mismatched singular and plural justification means are axially separable.

16. Means according to claim 9 in which the justification means at the first and second faces comprises marks at levels respective to the nature and number of the indicia borne by the respective body, and in which the justification means at the third and fourth faces comprise marks at levels respective to the requirement for and the presence of a member of the group consisting of Completer and Object.

References Cited
UNITED STATES PATENTS

| | | | |
|---|---|---|---|
| 1,477,322 | 12/1923 | Degheri | 273—157 |
| 1,531,542 | 3/1925 | Cogshall | 35—71 |
| 2,520,649 | 8/1950 | Northrop | 35—35 |
| 3,235,976 | 2/1966 | Elliot et al. | 35—35.9 |

EUGENE R. CAPOZIO, *Primary Examiner.*

W. GRIEB, *Assistant Examiner.*

UNITED STATES PATENT OFFICE
CERTIFICATE OF CORRECTION

Patent No. 3,333,351                                    August 1, 1967

Betty J. Williams

It is hereby certified that error appears in the above numbered patent requiring correction and that the said Letters Patent should read as corrected below.

Column 5, line 41, for "exemple" read -- example --; column 7, line 46, for "Objects" read -- Object --; line 50, for "NP > " read -- NP < --; column 8, line 16, for "the size," read -- the size --.

Signed and sealed this 27th day of May 1969.

(SEAL)
Attest:

Edward M. Fletcher, Jr.
Attesting Officer

Commissioner of Patents